Oct. 19, 1943.  A. L. SMITH  2,332,352
FROG OR FLOWER HOLDER FOR BOWLS
Filed May 13, 1941
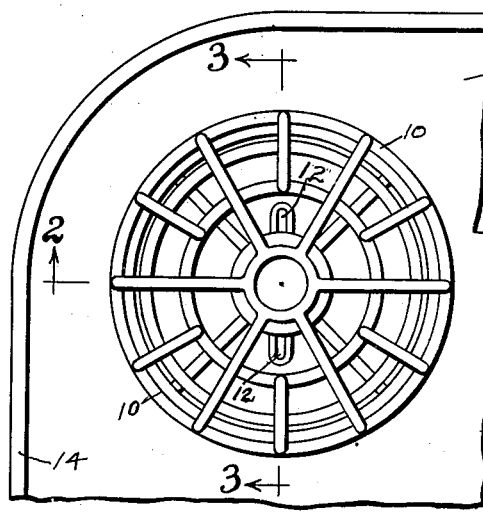
Fig. 1
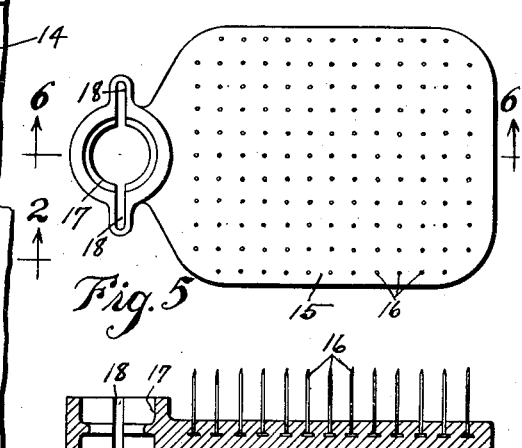
Fig. 5
Fig. 6
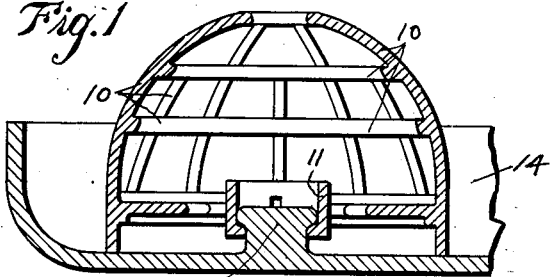
Fig. 2
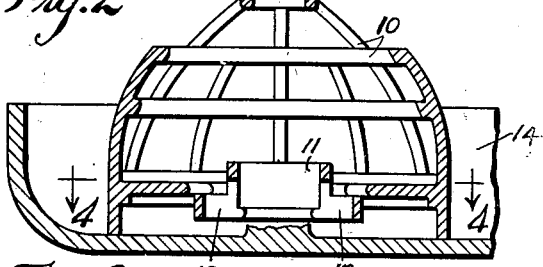
Fig. 3
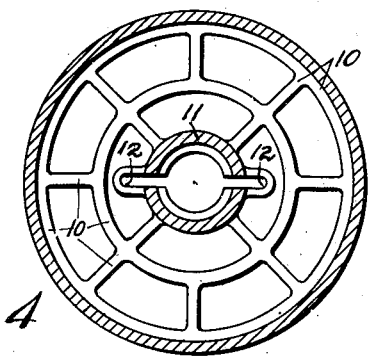
Fig. 4
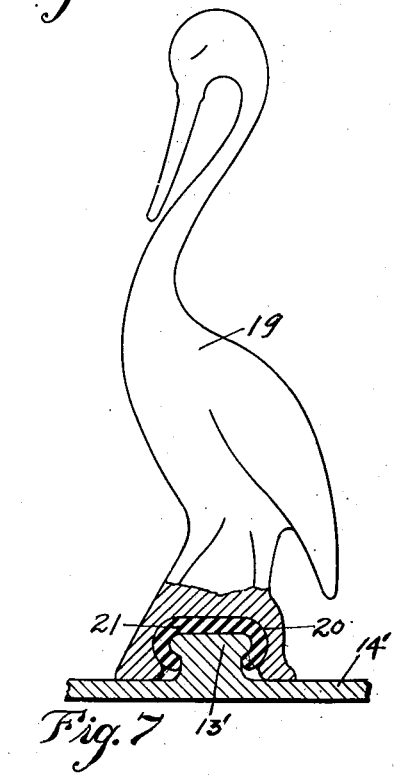
Fig. 7
INVENTOR.
Albert L. Smith,
BY Patented Oct. 19, 1943

2,332,352

UNITED STATES PATENT OFFICE 2,332,352

FROG OR FLOWER HOLDER FOR BOWLS

Albert L. Smith, Los Angeles, Calif., assignor to Artistic Potteries, Inc., Los Angeles, Calif., a corporation of California Application May 13, 1941, Serial No. 393,191

1 Claim. (Cl. 47—41)

When it is desired to arrange various flowers in a bouquet in a bowl or other vessel, rather than to have them pressed together into a restricted opening or mouth of a vase, jar or other receptacle, it is common to provide a holder, sometimes called a frog, which is placed on the bottom of the bowl and into which the stems of the flowers can be individually inserted and supported, thus making it possible to arrange a bouquet of flowers in a very artistic way.

It frequently happens that the flowers thus arranged are top heavy and tip the frog over so that the bouquet falls over in the bowl.

My invention has to do with providing a frog or flower holder with means for attaching it to the bottom of the bowl or container, so that it will not be tilted or overturned by the weight of the flowers placed therein.

It is an object of my invention to provide a frog or flower holder, or other object which it is desired to place in a bowl with the flowers, with means for quickly attaching it and as quickly removing it, whereby the flowers can be placed therein with safety.

In order to explain my invention, I have illustrated the same on the accompanying sheet of drawings, which I will now describe:

Figure 1 is a plan view of a frog or flower holder on a fragmentary portion of a bowl in which it is placed;

Figure 2 is a sectional view taken on line 2—2 of Fig. 1;

Figure 3 is a sectional view taken on line 3—3 of Fig. 1;

Figure 4 is a sectional view taken on line 4—4 of Fig. 3;

Figure 5 is a plan view of a modified holder;

Figure 6 is a sectional view therethrough, on line 6—6; and

Figure 7 is a view, partly in section, of an ornament similarly attached to the bottom of the bowl, with the flowers.

Referring now to the drawing in detail, one form of frog or flower holder is designated 10, and is provided in its bottom with an open center 11, in the form of a ring, with elongations at opposite sides, designated 12, 12, whereby to make provision for said center ring 11 to expand yieldingly enough to be pressed over a knob 13, in the bottom of the bowl, designated 14. Thus by pressing the bottom ring member 11 over the knob 13, as seen in Fig. 2, said frog or flower holder is held in place, and the flower stems can be inserted through the lattice dome-like frog or holder in a well known manner. It will be noted that the body of the dome-like member, 10, rests around its outer circumference on the bowl 14, so as to have a solid or firm bearing, and that the knob 13 is so held in the open central ring 11, that said frog or holder is securely held in place, and yet, because of the yielding nature of said central ring member 11, said frog or holder can be readily and easily removed. Said frog or holder can be formed of any suitable material of plastic or moldable nature and so as to be sufficiently resilient to serve the desired purpose.

In Figs. 5 and 6, I have shown a flower holder body 15 of flat form, provided with a series of upstanding pins 16, to receive flower stems, said body being provided at one side with an expandable ring portion, designated 17, and having the opposite loop-like extensions, as 18, 18, whereby the ring portion 17 can be pressed yieldingly down over a knob, such as the knob 13, in the bowl shown in the other views. This type of flower holder can be swung around to different positions and gives a larger base of flower holding means. It can be removed or replaced at will in the same manner as the holder shown in Figs. 1 and 2.

In Fig. 7 I have shown a water bird 19 having an open base 20, provided with a resilient filler ring or member 21, adapted to be pressed down over a knob 13' on the floor of a bowl, designated 14'.

Thus I have provided a simple, practical and economical frog or flower holder which can be quickly and easily attached to a bowl without bolts, or other fastening means requiring manipulation. I do not, however, limit my invention to the showing made, except as I may be limited by the hereto appended claim.

I claim:

An article of manufacture as shown consisting of a bowl having formed in its bottom an integral knob and a flower holder having as a part of its bottom a split ring-like portion with interconnected spaced radial elongations at opposite sides, whereby to make provision for said center ring to expand yieldingly enough to be pressed over said knob and to grip said knob by friction, the outer bottom portion of said flower holder resting on the bottom of said bowl outwardly from said knob, whereby to give more rigidity to said flower holder.

ALBERT L. SMITH.